United States Patent [19]

Jenkins

[11] Patent Number: 4,555,952

[45] Date of Patent: Dec. 3, 1985

[54] DIFFERENTIAL PRESSURE SENSOR

[75] Inventor: Patrick A. Jenkins, Decatur, Ill.

[73] Assignee: Borg-Warner Corporation, Chicago, Ill.

[21] Appl. No.: 618,667

[22] Filed: Jun. 8, 1984

[51] Int. Cl.$^4$ .............................................. G01F 1/38
[52] U.S. Cl. ................................... 73/861.47; 73/718; 73/861.61
[58] Field of Search ................. 73/717, 718, 719, 720, 73/721, 861.47, 861.48, 861.61, 861.65; 92/97

[56] References Cited

U.S. PATENT DOCUMENTS

| | | | |
|---|---|---|---|
| 2,406,181 | 8/1946 | Wiegand | 73/719 X |
| 2,509,078 | 5/1950 | Stover | 92/97 X |
| 3,245,266 | 4/1966 | Masters | 73/720 |
| 3,859,575 | 1/1975 | Lee et al. | 317/246 |
| 4,089,036 | 5/1978 | Geronime | 361/283 |
| 4,125,027 | 11/1978 | Clark | 73/274 |
| 4,382,377 | 5/1983 | Kleinschmidt et al. | 73/35 |
| 4,382,385 | 5/1983 | Paros | 73/702 |

OTHER PUBLICATIONS

Specification Sheets—Everett/Charles Marketing Services, Inc. Force Transducers—Model FT655.

Primary Examiner—Herbert Goldstein
Attorney, Agent, or Firm—Florian S. Gregorczyk

[57] ABSTRACT

A differential pressure sensor assembly is disclosed, which includes a transducer and a differential pressure sensor. The sensor responds to a fluid pressure change across an orifice of a known size and transfers this sensed pressure differential to the transducer. The electronic elements of the transducer are not exposed to the fluid which may be at an elevated temperature or have entrained particulates. The fluid flow can be determined by noting the fluid pressure change across the orifice of known size.

5 Claims, 1 Drawing Figure

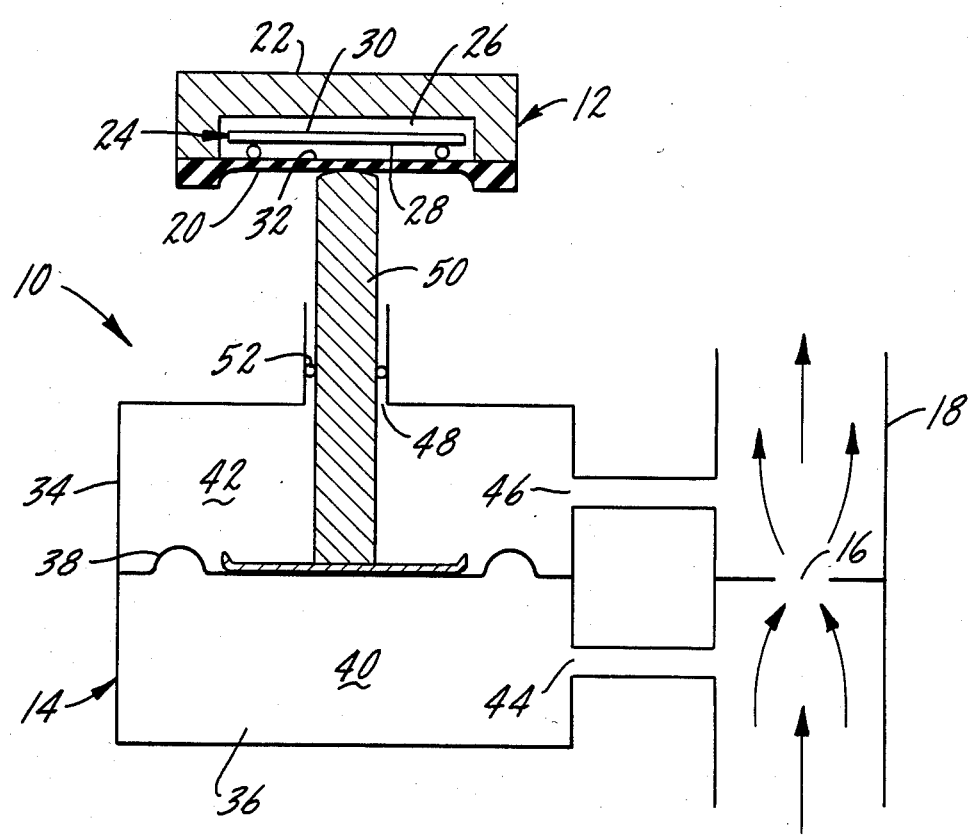

DIFFERENTIAL PRESSURE SENSOR

BACKGROUND OF THE INVENTION

1. Field of the Invention

The present invention relates to pressure sensors used in the measurement of pressure in fluid mediums, which mediums may be either liquid or gas.

2. Prior Art

Pressure sensors known in the prior art generally teach a pressure or force responsive diaphragm forming one plate or electrode of a capacitor. This electrode or capacitor plate is subject to deformation, the extent of which is compared to a second electrode means or capacitive plate that is not displaced. As the deformation varies the distance between such capacitor plates, an electrical or electrically translatable signal is produced which can be calibrated to relate the deformation to the deforming force. The production of such capacitor sensors or transducers is well known in the art.

An inherent part of the capacitive sensor structures available today is a ceramic diaphragm operator. However, the deformation of any diaphragm operator results from the differential force acting on both sides of such a diaphragm. This differential force is then translated into an electrical analog signal through an electrode means or capacitive plate sensor which in fact measures the deformation or displacement of such diaphragm operator. These analog signals are thereafter calibrated or related to the measured or sensed parameter. Such a variable capacitance sensor is illustrated in U.S. Pat. No. 3,859,575 (Lee et al) wherein a rod and plate are provided to react to a force and apply it to capacitive or separated electrode plates calibrated to measure the force applied to the rod. More specifically, the embodiment taught at FIG. 4 provides a force applied to rod 90 to increase the separation between electrode plates 5 and 23. Diaphragm or plate 96 is primarily provided to ensure centering of rod 90 and may be provided with pressure relieving holes or apertures. Thus, the forces communicated to the electrodes for measurement are provided through rod member 90. Alternatively, pressure forces may be communicated to rod 9 as in FIG. 1 through chamber 31 which forces act on the lower surface of the diaphragm. However, such force is measured as a difference between the pressure on either side of surface 5.

A means for indicating pressure in subterranean formations is taught in U.S. Pat. No. 4,125,027 (Clark). This patent discloses a variable capacitance sensor responsive to changes in ambient pressure, not to a differential pressure across an orifice. Further, it uses an arm extending from its diaphragm operator as a centering means to maintain location of its electrode or stator 24. However, there is no means provided to measure a differential pressure across an orifice nor is there any means disclosed to provide such measurement in a remote setting to protect, or provide a protective environment for, the electrodes associated with this sensor. U.S. Pat. No. 4,382,377 (Kleinschmidt et al.) teaches a piezoelectric pressure sensor for detecting knock and ping. This sensor is designed to be secured in a cylinder head for an internal combustion engine with the membrane diaphragm located within a cylinder. The forces being measured are provided at membrane 15. Again there is no provision in the structure to provide a differential pressure across an orifice in a flow passage. The reference pressure against which the sensed pressure is compared may be atmosphere or a vacuum, but it is not a pressure drop across an orifice.

A differential pressure transducer is taught in U.S. Pat. No. 4,382,385 (Paros). This transducer includes an air tight enclosure with a pair of pressure ports coupled to opposite sides of a pressure-sensing diaphragm or bellows. The force generated by the pressure differential is coupled to a stress-sensitive resonator either directly or through a force-transmitting structure. This structure teaches the use of bellows operators in cooperation with a resonator member or resonant sensitive member to provide a measured signal. In U.S. Pat. No. 4,089,036 (Geronime) a capacitive type load cell is disclosed having a diaphragm member mounted to a support for movement relative thereto. However, there is no indication of communication of a pressure or differential pressure across the diaphragm face to provide the force for moving such diaphragm. Further, the relationship of the diaphragm and support button is provided to reduce radial bending stresses in the diaphragm during loading, which implies that all loading is provided external to the electronic structure. Therefore, Geronime '036 recognizes the need to provide protective environments for electronic components.

The objective of the above devices is to provide a variable capacitance type signal to measure applied force. This measurement is proportional to, or a function of, a change in distance between capacitor plates. Some of the references identified above recognized the problem associated with the introduction of electronic components into harsh environments, but did not propose effective solutions. In the case of Kleinschmidt et al. '377, the sensor has been partially encapsulated with an expensive electronic structure to overcome the introduction of the device into a harsh environment. A similar device for force measurement is taught by Everett/Charles Marketing Services, Inc. Their model FT655 includes a force transducer in contact with a mechanical arm to move a pressure transducer diaphragm. This device is advertised specifically for use in an environment exposed to compression forces. The present invention provides a means for measurement of a differential pressure across an orifice in a harsh environment which may include fluids at elevated temperatures and entrained particulates. It utilizes a pressure sensor, particularly a capacitive pressure sensor, without exposing the electronic circuitry thereof to either heat, corrosion or dielectric degradation. Therefore, the pressure drop across an orifice is continuously provided, and as the orifice is of a known size it provides a means to measure flow rate.

BRIEF DESCRIPTION OF THE DRAWING

The single FIGURE of the drawing illustrates a diagrammatic cross-section of the present invention.

SUMMARY OF THE INVENTION

The present invention encompasses a differential pressure sensor assembly for remotely measuring the pressure drop of a fluid across an orifice in a fluid flow passage to sense fluid flow or pressure drop and communicate the differential pressure to an electrode transducer means such as a capacitive pressure sensor, without introducing extremes in heat or corrosive atmosphere to the transducer. This sensor assembly includes two elements, that is, a transducer and a pressure sensing transfer means to communicate a pressure differential to the transducer. This arrangement provides ease of assembly, protects the sensitive electronic elements, and a means to retain the dielectric atmosphere surrounding the electronic elements of the transducer. Therefore, the electronic pressure sensor is being utilized to sense a differential pressure but is insulated from a potentially destructive environment.

DETAILED DESCRIPTION OF THE INVENTION

The relationship of the parts of an assembly of a differential pressure sensor assembly 10 utilized for the measurement of pressure of a fluid medium is illustrated in the drawing. As there shown, a sensor assembly 10 includes three distinct elements: a transducer means 12; a sensing and pressure-response transfer means 14; and, an orifice 16 in a fluid passage 18. Transducer means 12 has a first diaphragm operator 20, a cover or housing 22 and a capacitance plate 24 which is positioned in chamber 26 defined by cover 22 and diaphragm 20. Capacitor plate 24 has a lower surface 28 and an upper surface 30. The transducer means, preferably a capacitive pressure transducer, is shown in the reference position with no deflection of its diaphragm 20. In this reference position capacitor plate 24 has an electrode or capacitance plate (not shown) mounted on surface 28 and parallel to a capacitor plate (not shown) mounted on the facing surface 32 defined by diaphragm 20. As diaphragm 20 is deflected, the capacitance changes between the plates on surfaces 28 and 32. These plates 28 and 32 comprise an electronic signal means which cooperates with any suitable electrical circuit (not shown). The capacitance varies with changes in diaphragm deformation producing a correspondingly varying signal which, as known in the art, can be related to the force producing the deflection of diaphragm 20.

Transfer means 14 includes a wall structure 34 defining an enclosure 36. Positioned in enclosure 36 is a second diaphragm operator 38 which cooperates with wall structure 34 to define an inlet chamber 40 and an outlet chamber 42. Wall structure 34 further defines an inlet port 44, an outlet port 46, and a stem port 48. A stem 50 is positioned in chamber 42 as shown, and is connected to and operable by second diaphragm operator 38. Stem 50 extends through stem port 48 to contact first diaphragm operator 20. A seal means 52 is provided to seal fluid flow through port 48. Inlet port 44 communicates between fluid passage 18 (upstream of orifice 16) and inlet chamber 40, and outlet port 46 communicates between fluid passage 18 (downstream of orifice 16) and outlet chamber 42.

In operation assembly 10 measures the pressure drop of fluid flow in passage 18 as the fluid passes through orifice 16, which passage 18 may be an exhaust gas recirculation passage of an automobile engine. The upstream pressure is communicated to inlet chamber 40 through inlet port 44. The downstream pressure is communicated to chamber 42 of the transfer means through outlet port 46, such downstream fluid pressure being lower than the upstream fluid pressure. Second diaphragm operator 38, which may be an elastomeric material for greater response, is displaced in response to the pressure differential. This diaphragm 38 movement will in turn move stem 50. Stem 50, in contact with first diaphragm 20, communicates this diaphragm 38 movement to the transducer assembly 12 causing diaphragm 20 and its associated capacitive plate means to deflect and vary the capacitance and thus vary an electrical signal related to the pressure drop through orifice 16. Therefore, the pressure drop across orifice 16, which is preferably a square-edged orifice, can be measured by a transducer assembly and, as the size of orifice 16 is known, the flow through such orifice can also be determined.

It can now be appreciated that the transducer 12 will measure a differential pressure across an orifice 16 of a known size without coming into contact with the fluid transferred through fluid passage 18. Such measurement in the past would require the fluid to be communicated to either side of diaphragm 20. Direct contact of the fluid, which may be at an elevated temperature or have entrained particulates, with the capacitive plate mounted side of diaphragm 20 would introduce heat and corrosive atmosphere into this sensitive area. Heat, corrosive atmospheres or particulate laden fluids would severely deteriorate, either through corrosion or by disturbing the dielectric constant within such enclosed chamber, the monitoring or calibration of the electronic means. Consequently, it has been the practice to utilize force measurement sensors balanced against atmospheric pressure or a pressure within an enclosed chamber such as 26 of transducer assembly 12. This would not provide effective measurement of a differential pressure.

Those skilled in the art will recognize that certain variations can be made in the illustrative embodiment. While only a specific embodiment of the invention has been described and shown, it is apparent that various alterations amd modifications can be made therein. It is, therefore, the intention in the appended claims to cover all such modifications and alterations as may fall within the true scope of the invention.

I claim:

1. A differential pressure sensor assembly for measuring the pressure drop across an orifice in a fluid flow passage at a location displaced from the orifice and passage, comprising:
    a transducor means including a housing, a first diaphragm operator, and an electronic signal means sealed in said housing and operable in response to movement of said first diaphragm operator;
    a sensing and pressure-response transfer means, including a wall structure defining an enclosure, a second diaphragm operator postioned in said enclosure to define an inlet chamber and an outlet chamber therein, said wall structure defining a stem port, an inlet port communicating between said inlet chamber and said fluid passage upstream of said orifice, and an outlet port communicating between said outlet chamber and said fluid passage downstream of said orifice;
    a stem connected to and operable by said second diaphragm operator, which stem extends through said stem port to contact said first diaphragm operator; and
    seal means to seal fluid flow through said stem port, the pressure drop across said orifice being monitored by said pressure-response transfer means and transmitted by said stem to said transducer means.

2. A differential pressure sensor assembly as claimed in claim 1 wherein said transducer means is a capacitive pressure transducer.

3. A differential pressure sensor assembly as claimed in claim 1 wherein said orifice is a square edged orifice.

4. A differential pressure sensor assembly as claimed in claim 1 wherein said second diaphragm operator is of an elastomeric material.

5. A differential pressure sensor assembly as claimed in claim 1 wherein said fluid flow passage is an exhaust gas recirculation passage of an automobile engine.

* * * * *